Patented July 12, 1932

1,866,560

UNITED STATES PATENT OFFICE

DAVID GORDON, OF TARRYTOWN, NEW YORK, AND ROGER W. RYAN, OF DOVER, NEW JERSEY, ASSIGNORS TO THE CONSOLIDATED GAS COMPANY OF NEW YORK, OF NEW YORK, N. Y., A CORPORATION OF NEW YORK

DEHYDRATION OF GAS

No Drawing. Application filed March 5, 1928. Serial No. 259,380.

This invention relates to improvements in the dehydration of gas. The invention is of particular value for use in connection with the dehydration of fuel gases which are to be distributed in ordinary gas mains. It is also applicable for the dehydration of air.

It has heretofore been proposed to use concentrated or saturated solutions of calcium chloride for dehydrating air and other gases and it has also been proposed to employ glycerine for that purpose. Saturated solutions of calcium chloride have the objectionable feature that if the temperature is lowered below that of saturation they tend to solidify or "freeze" to form a solid mass which must again be heated before it can be employed. To avoid this objection, care must be taken to keep the solution at or above the temperature at which it is saturated. For effective dehydration, moreover, a considerable amount of calcium chloride solution is required, and, with lesser amounts, the extent of dehydration becomes limited. Furthermore, even when using large amounts of calcium chloride the degree of dehydration is definitely limited by the concentration of the solution. Glycerine, while effective as a dehydrating agent, is relatively expensive and presents some difficulty in its use and regeneration by dehydration.

We have found that dehydration of gases can be effected in a particularly advantageous manner by the use of a supersaturated aqueous solution of a hygroscopic salt, such as calcium chloride, to which is added a substance, such as glycerine, which interferes with crystallization of the salt. By adding such an agent as glycerine to an aqueous solution of the hygroscopic salt, solutions far beyond the saturation point can readily be produced from which on cooling any excess of the crystallizable salt crystallizes in a finely divided form such that it is readily maintained in suspension in the solution.

The hygroscopic salts employed, according to the present invention, include not only calcium chloride but other salts such as magnesium chloride, zinc chloride, potassium acetate, etc. The substances we use to interfere with crystallization of the salts in supersaturated solution are non-volatile water soluble organic materials, preferably of the polyhydric alcohol type. Among these may be mentioned glycerine, ethylene glycol, sucrose (common sugar), dextrin, dextrose, invert sugar, starch, gelatine, gum arabic, glue, etc. These agents vary somewhat in effectiveness and in the amounts required to be added to stabilize the supersaturated solution of the salts.

The proportions of salt employed in the supersaturated solution will depend somewhat upon the particular salt and also upon the particular agent employed to interfere with crystallization of the salt. In general, however, the proportion of hygroscopic salt to water is greater than that in a saturated solution of the salt at normal minimum temperature of use.

A saturated solution of calcium chloride in water, without the addition of a substance which interferes with crystallization of the calcium chloride, will contain about 42% by weight of calcium chloride (anhydrous basis) at 60° F. We have found it possible to prepare a mixture containing a ratio of as much as 60 parts or more of calcium chloride (anhydrous basis) to 40 parts of water by the addition of glycerine to the solution. These proportions of calcium chloride to water, i. e. 60 parts of calcium chloride to 40 parts of water are equivalent to a saturated solution at about 180° F. If such a solution, saturated at 180° F. were cooled to ordinary temperatures, it would set to a solid mass. However, by adding glycerine to such a hot saturated solution, it can be cooled to ordinary temperature and it will remain sufficiently fluid at normal temperature to permit its use in a liquid state in suitable apparatus for contacting gas with liquid.

As an example of the new dehydrating composition may be mentioned the following:

Parts by weight
Calcium chloride (anhydrous basis)____ 60
Water _____ 40
Glycerine (anhydrous)_____ 25

This mixture, instead of being a solid at ordinary temperature, remains fluid at normal temperatures and can be contacted with gas in normal types of scrubbing apparatus.

Such a composition can readily be prepared by dissolving the calcium chloride in water at the requisite elevated temperature so that complete solution is obtained and by adding glycerine to the hot solution before cooling, and then cooling the mixture, or by adding calcium chloride to an aqueous solution of glycerine, with heating and evaporation of water if necessary, or by concentrating a dilute aqueous solution of calcium chloride and glycerine. Such crystallization of the calcium chloride as takes place on cooling is in the form of fine crystals which for the most part remain in suspension, or, insofar as they tend to settle out, can readily be put in suspension again by agitation of the mixture. These fine crystals appear to contain both water and glycerine of combination or crystallization.

Another example of the new composition is represented by approximately 40% by weight of calcium chloride (anhydrous basis), 20% of glycerine (anhydrous) and 40% of water. The proportions of water, calcium chloride and glycerine can be somewhat varied, and, in place of the glycerine, other agents preventing or inhibiting crystallization can be employed, for example, ethylene glycol, etc.

In employing the new compositions for the dehydration of gas, the gas can be brought into contact with the liquid compositions in different types of apparatus, such as a brush washer, a packed tower filled with coke or other filling material, or other suitable types of gas washing or scrubbing apparatus.

The treatment of the gas with the liquid compositions can advantageously be carried out in a continuous and countercurrent manner so that the fresh gas to be dehydrated is first brought into contact with the composition after it has absorbed a considerable amount of water, and so that the gas from which most of the water has been separated is brought into contact with the fresh material where it can exert a maximum dehydrating effect.

Instead of using a single piece of apparatus, two or more pieces of apparatus can be employed in a countercurrent manner with the gases passing upwardly through the apparatus in series and the liquid going downwardly through the apparatus in a countercurrent manner.

An important advantage of the new composition thus employed is that even though a dehydating mixture is employed in a form so concentrated that after cooling it separates considerable quantities of crystals, this crystal slurry can be pumped and handled as a liquid and contacted with the gas in the ordinary types of equipment employed for liquid absorbing agents. Such a suspension possesses the advantage that as it absorbs water it does not at first dilute rapidly but merely dissolves some of the suspended crystals. So long as any of these crystals remain the partial pressure of water vapor of the liquid absorbent remains low and consequently its dehydrating efficacy is relatively unimpaired. Even after the suspended crystals are completely dissolved the solution still remains an effective dehydrating material. These advantages are not obtainable with liquid absorbing agents such as saturated solutions of calcium chloride which immediately become unsaturated as soon as absorption of water takes place.

At the end of the dehydration, the dehydrating composition will be diluted with absorbed water. The extent to which it is diluted will vary with the temperature and water content of the gases being dehydrated, with the dehydrating agent employed and with the conditions of contact. The spent dehydrating agent, diluted with water from the dehydrating operation, can be regenerated for use by treating it for removal of water in suitable apparatus, such as is commonly used for concentrating liquids, after which it is cooled and returned to the washer system. The diluted solution can, for example, be concentrated in single effect or multiple effect vacuum evaporators and brought to the required extent of dehydration to regenerate the composition for reuse.

In regeneration, our dehydrating agents have the advantage over calcium chloride solutions, containing no added materials to prevent crystallization, that less care needs to be taken to stop the concentration and evaporation of water at a given point. With calcium chloride alone the solution cannot be concentrated beyond that of a saturated solution at normal temperatures without danger of freezing and solidifying of the solution when cooled below its saturation temperature. With the new composition, however, the concentration can be carried beyond that of a saturated solution without objectionable freezing or solidification when the solution or mixture is again cooled for use.

The present invention is of particular value for use in the dehydration of fuel gas. Such fuel gases are commonly saturated with water at the temperature at which they are purified and have a relatively high dew point, for example, around 60 to 80° F. When such gases are placed in gas holders of the dry type, sealed with tar, the cooling of the gas in cold weather or in the night time when the surrounding temperature falls, condenses more or less water which forms objectionable emulsions with the tar of the tar seal of the dry gas holder. When such wet gas is distributed in the distributing mains and cooled to the prevailing main temperature, considerable condensation takes place with resulting corrosion and with the necessity of pumping out the main to remove the condensation. In order to prevent such condensation, it is necessary to lower the dew point of the gases until they have a dew point below that of the prevailing temperature in the gas holder and in the distributing main.

With solutions of calcium chloride in water which do not have added thereto substances retarding the crystallization of the calcium chloride and which are at or below the saturation of calcium chloride in the solution, the dehydrating efficacy is low. Expressed in percent relative humidity of gas in equilibrium with the calcium chloride solution in water, a solution containing 40% calcium chloride is in equilibrium with gas of about 41% relative humidity, at a temperature of about 70° F., and this is the lowest humidity to which this dehydrating agent can possibly dry the gas.

With the new dehydrating composition, containing 60% calcium chloride in water and with glycerine added, the solution is in equilibrium with gas of about 18% relative humidity, at approximately 70° F. As a result of the lower vapor pressure of more concentrated solutions, lower relative humidities of gas are obtainable, so that it is possible to produce gas of lower dew point than with less concentrated solutions. This is of particular importance where it is desirable to reduce the dew point to a low temperature, e. g. around 30° F. in order to avoid condensation of water in the distributing mains of the gas system.

The following specific example will further illustrate the application of the invention to the dehydration of fuel gas.

The washer employed was a vertical rotary washer through which coal gas was passed at a rate approximating 10,000 cubic feet per hour. The washer sections were equipped with cooling coils through which water was circulated at a rate sufficient to absorb the heat of reaction. The dehydrating agent employed was a mixture of 52 parts by weight of calcium chloride (anhydrous basis), 48 parts by weight of water and 25 parts by weight of glycerine (anhydrous basis). The gas entered the washer at a temperature of about 75° F. and an average dew point of 73° F. and left the washer at substantially the same temperature with a dew point overaging 35° F. The dehydrating composition was supplied to the washer at a rate of 1.5 gallons per hour.

For comparison, a straight water solution of calcium chloride approximately saturated at 80° F. was used in a similar manner with gas entering the washer substantially saturated at an average temperature of 75° F. and leaving substantially at the same temperature and at a dew point of 43° F. The amount of the calcium chloride solution employed in this case was approximately 4.0 gallons per hour.

From these examples illustrating the process of the present invention as compared with the process in which calcium chloride solutions alone are employed, it will be seen that a greater degree of dehydration of the gas was obtained by the practice of the process of the present invention with the use of only about one-third the amount of dehydrating composition required in the case of a saturated solution of calcium chloride.

This radical reduction in the amount of dehydrating composition required to be added for effectively dehydrating the gas has the further advantage that the amount of diluted solution to be concentrated is correspondingly reduced. The advantages of the present invention are therefore cumulative. Effective dehydration can be obtained to produce gas of low dew point with comparatively small quantities of the dehydrating composition, and less of the diluted composition will be produced. The handling of the new composition moreover, is without danger of setting or freezing in the pipes or containers which is met with in handling saturated solutions of calcium chloride where proper precautions are not taken, or where the solutions for one reason or another become cooled below the saturation temperature. The added expense of the glycerine, although it makes the composition more expensive per unit of composition than saturated solutions of calcium chloride, is comparable in expense with calcium chloride solutions from the standpoint of water removing power. That is, the cost of the composition required for dehydration, per pound of water removed, is approximately the same as with straight calcium chloride solutions.

While we have described our invention more particularly in connection with the use of supersaturated calcium chloride solutions having glycerine added thereto, and the dehydration of fuel gas therewith, it will be understood that the invention is not limited thereto, but is of broader scope, as hereinbefore pointed out; and that other hygroscopic salts than calcium chloride can be employed, as well as other agents than glycerine for preventing or retarding crystallization of the hygroscopic salts from the supersaturated solutions.

We claim:

1. The method of dehydrating gas which comprises bringing the gas at normal temperatures into contact with a supersaturated aqueous solution of a hygroscopic salt containing a sufficient amount of an organic substance interfering with crystallization of the salt from such solution to prevent freezing under conditions of use.

2. The method of dehydrating gas which comprises bringing the gas into intimate contact with a dehydrating composition comprising a supersaturated solution of calcium chloride in water to which a sufficient amount of glycerine has been added to prevent freezing under conditions of use.

3. The method of dehydrating gas which comprises bringing the gas into intimate contact wth a dehydrating composition comprising a supersaturated solution of calcium chloride in water to which a sufficient amount of a nonvolatile water soluble organic substance interfering with crystallization of the calcium chloride has been added.

4. The method of dehydrating gas which comprises bringing the same into contact with a supersaturated solution of calcium chloride in water to which glycerine has been added, the solution containing initially at least 50% of calcium in water.

5. The method of dehydrating gas which comprises bringing the gas into intimate countercurrent contact with a supersaturated solution of a hygroscopic chloride in water containing an organic substance interfering with crystallization of the chloride and containing finely divided crystals of the hygroscopic chloride in suspension, said organic substance also serving to promote the holding of the finely divided crystals in suspension in the supersaturated solution of the hygroscopic chloride.

6. The method of dehydrating gas which comprises bringing the gas into countercurrent contact with a supersaturated solution of calcium chloride in water containing glycerine and containing finely divided crystals of calcium chloride in suspension.

In testimony whereof we affix our signatures.

DAVID GORDON.
ROGER W. RYAN.

CERTIFICATE OF CORRECTION.

Patent No. 1,866,560.     July, 12, 1932.

DAVID GORDON ET AL.

It is hereby certified that error appears in the printed specification of the above numbered patent requiring correction as follows: Page 3, line 55, for "overaging" read averaging; page 4, line 19, claim 4, after "calcium" insert the word chloride; and that the said Letters Patent should be read with these corrections therein that the same may conform to the record of the case in the Patent Office.

Signed and sealed this 6th day of September, A. D. 1932.

(Seal)     M. J. Moore,
Acting Commissioner of Patents.